(12) United States Patent
Beuchelt (10) Patent No.: US 12,125,654 B2
(45) Date of Patent: Oct. 22, 2024

(54) VOLTAGE LIMITING DEVICE HAVING A SWITCHING DEVICE

(71) Applicant: Rail Power Systems GmbH, Munich (DE)

(72) Inventor: Julian Beuchelt, Eppstein (DE)

(73) Assignee: Rail Power Systems GmbH, Munich (DE)

( * ) Notice: Subject to any disclaimer, the term of this patent is extended or adjusted under 35 U.S.C. 154(b) by 241 days.

(21) Appl. No.: 17/625,303

(22) PCT Filed: Jul. 17, 2020

(86) PCT No.: PCT/EP2020/070383
§ 371 (c)(1),
(2) Date: Jan. 6, 2022

(87) PCT Pub. No.: WO2021/013767
PCT Pub. Date: Jan. 28, 2021

(65) Prior Publication Data
US 2022/0254592 A1    Aug. 11, 2022

(30) Foreign Application Priority Data

Jul. 25, 2019  (EP) .................................... 19188422

(51) Int. Cl.
*H01H 50/54* (2006.01)
*B60M 5/02* (2006.01)
*H01H 50/14* (2006.01)

(52) U.S. Cl.
CPC .............. *H01H 50/54* (2013.01); *B60M 5/02* (2013.01); *H01H 50/14* (2013.01)

(58) Field of Classification Search
None
See application file for complete search history.

(56) References Cited

U.S. PATENT DOCUMENTS 3,171,920 A     3/1965  Klein et al.
4,467,301 A  *  8/1984  Goodrich ................. H01H 1/54
                                                       335/195
(Continued)

FOREIGN PATENT DOCUMENTS

DE    102008049706 A1   4/2010
EP        1901320 A1    3/2008
(Continued)

OTHER PUBLICATIONS

International Report on Patent Patentability for corresponding PCT/EP2020/070383, dated Jan. 25, 2020, 8 pages (not prior art).
(Continued)

*Primary Examiner* — Bernard Rojas
(74) *Attorney, Agent, or Firm* — Lucian Wayne Beavers; Patterson Intellectual Property Law, PC (57) ABSTRACT

The invention relates to a voltage limiting device having a switching device 5 which has a movable switching contact 16 which can be moved between a closed position and an open position, an electrical conductor 10 electrically connecting a first cable terminal 11 to the switching device and an electrical conductor 12 electrically connecting a second cable terminal 13 to the switching device. The voltage limiting device according to the invention is characterised by a special arrangement and design of a conductor portion of one of the two electrical conductors 10, 12. A conductor portion 10B, 12B of an electrical conductor 10, 12 is arranged or designed in such a way that this conductor portion, together with the movable switching contact 16 of the switching device 5, forms an arrangement of conductors through which currents flow in opposite directions during operation of the switching device. As a result, electrodynamic forces act on the movable conductor and the fixed conductor and are directed in such a way that the conductors repel one another. The switching contacts therefore tend to (Continued)

close. The voltage limiting device can switch higher loads without the conductive parts having to be reinforced or other technical measures having to be undertaken.

15 Claims, 7 Drawing Sheets

(56) References Cited

U.S. PATENT DOCUMENTS

| | | | | |
|---|---|---|---|---|
| 5,613,865 | A | 3/1997 | Dullin et al. | |
| 11,417,488 | B2 | 8/2022 | Beuchelt | |
| 2013/0021122 | A1* | 1/2013 | Uchida | H01H 50/546 335/131 |
| 2013/0342294 | A1* | 12/2013 | Aarskog | H01H 53/02 335/196 |
| 2016/0104992 | A1* | 4/2016 | Hammond | H01R 13/2478 439/32 |
| 2020/0168408 | A1* | 5/2020 | Mori | H01H 50/14 |
| 2020/0381203 | A1* | 12/2020 | Sakaguchi | H01H 50/42 |
| 2022/0254592 | A1 | 8/2022 | Beuchelt | |

FOREIGN PATENT DOCUMENTS

| | | |
|---|---|---|
| EP | 3287312 A1 | 2/2018 |
| FR | 3007888 A1 | 1/2015 |
| JP | 2011210732 A | 10/2011 |
| WO | 2014207111 A1 | 12/2014 |
| WO | 2019031588 A1 | 2/2019 |

OTHER PUBLICATIONS

International Search Report from the corresponding PCT application No. PCT/EP2020/070383.
Co pending U.S. Appl. No. 17/625,299 (not prior art).
International Search Report corresponding to related application Serial No. PCT/EP2020/070378.
European Patent Office Apr. 5, 2023 Office Action for corresponding patent application No. 19 188 422.0 including a Google Translation, 7 pages (not prior art).
U.S. Office Action of Dec. 21, 2023 in co-pending U.S. Appl. No. 17/625,299 (not prior art) (24 pages).
U.S. Office Action of Jul. 1, 2024 in co-pending U.S. Appl. No. 17/625,299 (not prior art) (12 pages).

* cited by examiner

VOLTAGE LIMITING DEVICE HAVING A SWITCHING DEVICE

The invention relates to a voltage limiting device having a switching device which has a movable switching contact that can be moved between a closed position and an open position, and a first cable terminal and a second cable terminal, a first electrical conductor electrically connecting the first cable terminal to the switching device and a second electrical conductor electrically connecting the second cable terminal to the switching device.

Voltage limiting devices (VLD) are used in the field of rail power supply, in particular in the field of DC-powered railways. In the case of DC-powered railways, the rail is often used as a return conductor for the traction current, the rail being isolated from the earth in order to prevent stray currents from occurring. Due to the electrical resistance of the rail, the return current flowing through the rail results in a potential difference with respect to the earth, which can be tapped as a voltage between rail and earth. Voltage limiting devices are prescribed to avoid impermissible contact voltages that can occur during operation or in the event of a fault. The voltage limiting device is a self-resettable earthing short-circuiter, which is generally installed between the rail and the earthing system and which responds at a defined threshold value for the contact voltage.

The known voltage limiting devices have a switching device that creates an electrical connection between two cable terminals. Depending on the design, the switching device has a single-pole or multi-pole contactor which has a fixed and a movable switching contact actuated by an actuation unit. The switching device may also comprise a thyristor connected in parallel.

In the known contactors, the contact surfaces of the fixed switching contact and the movable switching contact are generally opposite one another. An immovable conductor connects the fixed switching contact to a first device terminal and a movable conductor connects the movable switching contact to a second device terminal. In these arrangements of switching contacts and conductors, which are designed for frequent switching, electrodynamic forces occur which act on the switching contacts. These forces are directed in such a way that the switching contacts tend to be opened.

In certain applications, the contactor must be able to switch very often and/or very quickly, and must also be able to switch on high currents and conduct them for a certain time. If the current intensity becomes too high, technical measures must be undertaken to prevent the contactor from being destroyed when it is switched on.

A known technical measure in voltage limiting devices is to operate the contactor together with thyristors, which are triggered depending on the switching of the contactor. The thyristors can switch in a few microseconds, while the contactor has a closing time that can be between 100 and 200 ms. After the thyristors have been triggered, the contactor can take over the load. A control apparatus is provided to control the contactor or the thyristors. All components are usually located in a control cabinet.

The problem addressed by the invention is to create a voltage limiting device which allows higher switching capacities when switching on and the brief conducting of a high current.

This problem is solved, according to the invention, by the features of claim 1. The subject matter of the dependent claims relates to advantageous embodiments of the invention.

The voltage limiting device according to the invention comprises a switching device by means of which an electrical connection between a first cable terminal and a second cable terminal can be produced, a first electrical conductor electrically connecting the first cable terminal to the switching device and a second electrical conductor electrically connecting the second cable terminal to the switching device. Corresponding device terminals or electrical connection surfaces can be provided on the switching device. The two electrical conductors may each have a plurality of conductive parts. Further electrical components can also be provided in the relevant current path.

The voltage limiting device according to the invention is characterised by a special arrangement and design of a conductor portion of the first or second electrical conductor which electrically connects the first or second cable terminal, respectively, to the switching device. A conductor portion of the first or second electrical conductor is arranged or designed in such a way that this conductor portion, together with the movable switching contact of the switching device, forms an arrangement of conductors through which currents flow in opposite directions during operation of the switching device.

The voltage limiting device is particularly characterised in that a conductor portion of the first or second electrical conductor is arranged in a substantially parallel orientation to the movable switching contact in front of the movable switching contact in a region in which the movable switching contact moves away from the conductor portion where there is movement from the open position into the closed position. The voltage limiting device is thus designed or can thus be operated in such a way that the movable switching contact and a conductor portion of the first or second conductor form an arrangement of parallel conductors through which currents flow in opposite directions. The current flow results in electrodynamic forces acting on the movable switching contact (conductor) and the fixed conductor (current path), which forces are directed in such a way that the conductors repel one another. Because the conductor portion of the first or second conductor is arranged in front of the movable conductor in such a way that the movable switching contact moves away from the conductor portion when there is movement from the open position into the closed position, the switching contacts tend to close. It has been shown that this reduces the forces to be applied by the switching device to close the switching contact and relieves the load on the conductive parts (switching contacts). This improves the electrical properties of the voltage limiting device. The voltage limiting device can switch higher loads without the conductive parts having to be reinforced or other technical measures having to be undertaken.

The invention relates in particular to the arrangement and design of the connecting lines of the switching device. For this aspect of the invention, the design of the switching device is fundamentally unimportant as long as the switching device has a movable switching contact that interacts with one of the two connecting lines.

In a preferred embodiment, the switching device has a first and a second fixed switching contact and a movable switching contact. In the case of a switching contact, this does not mean that only one switching contact has to be provided. Rather, the switching device according to the invention may also have a plurality of fixed or movable switching contacts. For example, the switching device may comprise a plurality of assemblies, each of which has a first and a second fixed switching contact and a movable switching contact. These assemblies can be operated separately in order to switch a plurality of currents, or the assemblies can be connected in parallel.

In a preferred embodiment, in the closed position, the conductor portion of the first or second electrical conductor, which portion is arranged in front of the movable switching contact in a substantially parallel orientation to the movable switching contact, and the movable switching contact lie in one plane. However, the conductor portion of the first or second conductor and the movable switching contact do not need to be precisely aligned with one another, i.e. the conductors can also lie in planes that are slightly offset from one another.

The conductor portion arranged in front of the movable switching contact in a parallel orientation to the movable switching contact can in principle have any design, i.e. have any cross-section and any length, as long as this conductor portion and the movable switching contact form an arrangement of parallel conductors through which currents flow in opposite directions and which repel one another.

The strength of the electrodynamic forces depends on the current intensity, on which the dimensioning of the conductors also depends.

In a preferred embodiment, the conductor portion of the first or second electrical conductor, which portion is arranged in front of the movable switching contact in a substantially parallel orientation to the movable switching contact, is a straight electrical conductor portion which preferably has a rectangular cross-section. The conductor portion is preferably arranged in such a way that its wide side faces the movable switching contact.

The direction of the current flow through the first or second conductor depends on the potential that is applied to the first or second cable terminal, i.e. whether the first or second cable terminal is at earth potential.

The conductor portion of the first or second electrical conductor, which portion is arranged in front of the movable switching contact in a substantially parallel orientation to the movable switching contact, has a first end portion facing the first fixed switching contact and a second end portion facing the second fixed switching contact.

One embodiment provides that the first electrical conductor has a conductor portion which extends from the first cable terminal to the second end portion of the conductor portion of the first electrical conductor, which conductor portion is arranged in front of the movable switching contact in a parallel orientation to the movable switching contact, and the first electrical conductor has a conductor portion which extends from the first end portion of the conductor portion of the first electrical conductor, which conductor portion is arranged in front of the movable switching contact in a parallel orientation to the movable switching contact, to the switching device. In this embodiment, the second electrical conductor extends from the switching device to the second cable terminal.

In an alternative embodiment, the first electrical conductor extends from the first cable terminal to the switching device. The second electrical conductor has a conductor portion which extends from the switching device to the second end portion of the conductor portion of the second electrical conductor, which conductor portion is arranged in front of the movable switching contact in a parallel orientation to the movable switching contact, and the second electrical conductor has a conductor portion which extends from the first end portion of the conductor portion of the second electrical conductor, which conductor portion is arranged in front of the movable switching contact in a parallel orientation to the movable switching contact, to the second cable terminal.

In both embodiments, currents which flow in different directions flow through the conductor portion of the first or second conductor and the movable switching contact.

In addition to the above embodiments, however, other embodiments are also possible in which the first and second conductors are connected in such a way that the current flows from the second fixed switching contact via the movable switching contact to the first fixed switching contact.

Another aspect of the invention relates to the design and arrangement of the switching contacts of the switching device. A preferred embodiment of the switching device provides that the first and second fixed switching contacts are arranged in such a way that their contact surfaces point in the same direction. The movable switching contact can be moved between a closed position, in which the first and second fixed switching contacts are electrically connected to one another, and an open position, in which the first and second fixed switching contacts are disconnected from one another. The first and second fixed switching contact and the movable switching contact form an arrangement of electrical conductors which are arranged substantially parallel to one another.

In this arrangement of switching contacts, it is of particular importance that the contact surface of at least one of the fixed switching contacts is an elongate contact surface which extends in the direction of current flow. The contact surfaces of the two fixed switching contacts are preferably elongate contact surfaces. In this context, an elongate contact surface is understood to mean a contact surface which has a length in the direction of current flow that is always greater than the width of the contact surface. The contact surface of at least one of the fixed switching contacts preferably has a length in the direction of current flow which is at least twice as long as the width of the contact surface. The contact surface should be as long as possible in relation to its width. The direction of current flow is defined as the direction in which the current flows from one fixed switching contact via the movable switching contact to the other fixed switching contact. Consequently, the arrangement of switching contacts forms an elongate conductor arrangement.

The switching device is thus designed or can thus be operated in such a way that currents in the same direction flow through the fixed switching contacts and the movable switching contact which contacts the fixed switching contacts. The current flow has the effect that electrodynamic forces act on the fixed conductors and the movable conductor and are directed in such a way that the conductors attract one another, i.e. the switching contacts tend to close. It has been found that this reduces the forces acting on the conductive parts of the switching device, in particular the switching contacts thereof, in order to open them, and relieves the load on the switching contacts. This improves the electrical properties of the switching device. The switching device can switch higher loads without the contacts of the switching device having to be reinforced or other technical measures having to be undertaken. This effect intensifies the effect described above, which is due to the special arrangement and design of the conductors leading to the switching device.

The special arrangement and design of the switching contacts distinguishes the switching device according to the invention from the arrangement and design of the switching contacts of commercially available switching devices, the switching contacts or contact surfaces of which are usually punctiform, square or rectangular, the rectangular contacts being wide and short in the direction of current flow.

The first and second fixed switching contact and the movable switching contact can in principle have any design, i.e. have any cross-section and any length, as long as the switching contacts form an arrangement of substantially parallel conductors through which currents flow in the same direction and which attract one another. The strength of the electrodynamic forces depends on the current intensity.

A preferred embodiment of the switching device provides that the first and second fixed switching contacts are straight electrical conductors which have a rectangular cross-section. The switching contacts may also have an elliptical or round cross-section, for example. In the case of a rectangular cross-section, it is advantageous if the first and second fixed switching contacts are arranged in such a way that their wide sides form the contact surfaces. The fixed switching contacts are therefore preferably short flat rails. The movable switching contact is likewise preferably a straight electrical conductor which has a rectangular cross-section, the wide side of which preferably forms the contact surface. As a result, the wide sides of the switching contacts are opposite one another.

The region in which the movable switching contacts and the fixed switching contact are opposite one another should be as large as possible, so that the resulting electrodynamic forces are large. This is achieved in particular when the length of the movable switching contact is greater than or equal to the sum of the lengths of the first and second fixed switching contacts and the distance between the first and second fixed switching contacts. As a result, the movable switching contact extends over the entire available length of the fixed contacts.

In a further preferred embodiment, the movable switching contact can be pivoted between the closed position and the open position about an axis which runs parallel to the longitudinal axes of the first and second fixed switching contacts. However, the movable switching contact can also exercise a movement other than a rotary movement, for example a linear movement.

The movable switching contact can be actuated by an actuation unit, which can be designed differently. The actuation unit can be, for example, an electromagnetic actuation unit.

The voltage limiting device can be arranged in a conventional control cabinet which may have a front and a back, a left-hand side part and right-hand side part, and a top part and a bottom part. The control cabinet can also accommodate other components of a voltage limiting device known from the prior art, for example a control unit for the actuation unit.

Embodiments of the voltage limiting device according to the invention are explained in detail below with reference to the drawings,
in which.

Figure 1:
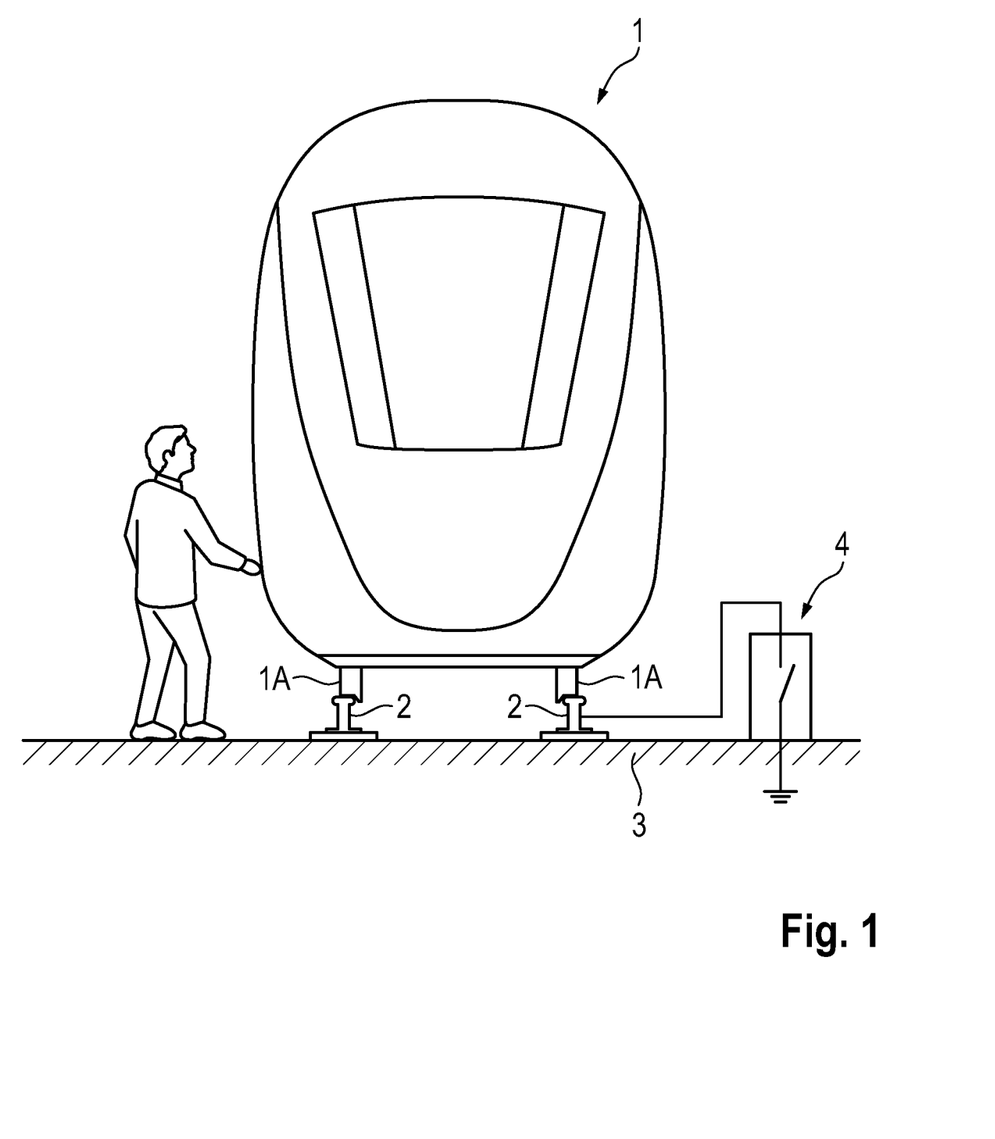
FIG. 1 is a greatly simplified schematic view of a rail vehicle and a voltage limiting device.

FIG. 1 shows a DC-powered rail vehicle together with a voltage limiting device. The rail vehicle 1 has wheels 1A which run on a rail 2. The rail 2 of the railway system is isolated from the earth 3. The electrical resistance of the rail 2 results in the occurrence of a potential difference between the rail vehicle 1 or the rail 2 and the earth 3. The voltage limiting device 4 prevents the occurrence of impermissible contact voltages during normal railway operation or in the event of an error (short circuit). The voltage limiting device 4 is installed between the rail 2 and the earthing system and can establish an electrical connection between the rail 2 and earth 3 (earthing short-circuiter).

Figure 2:
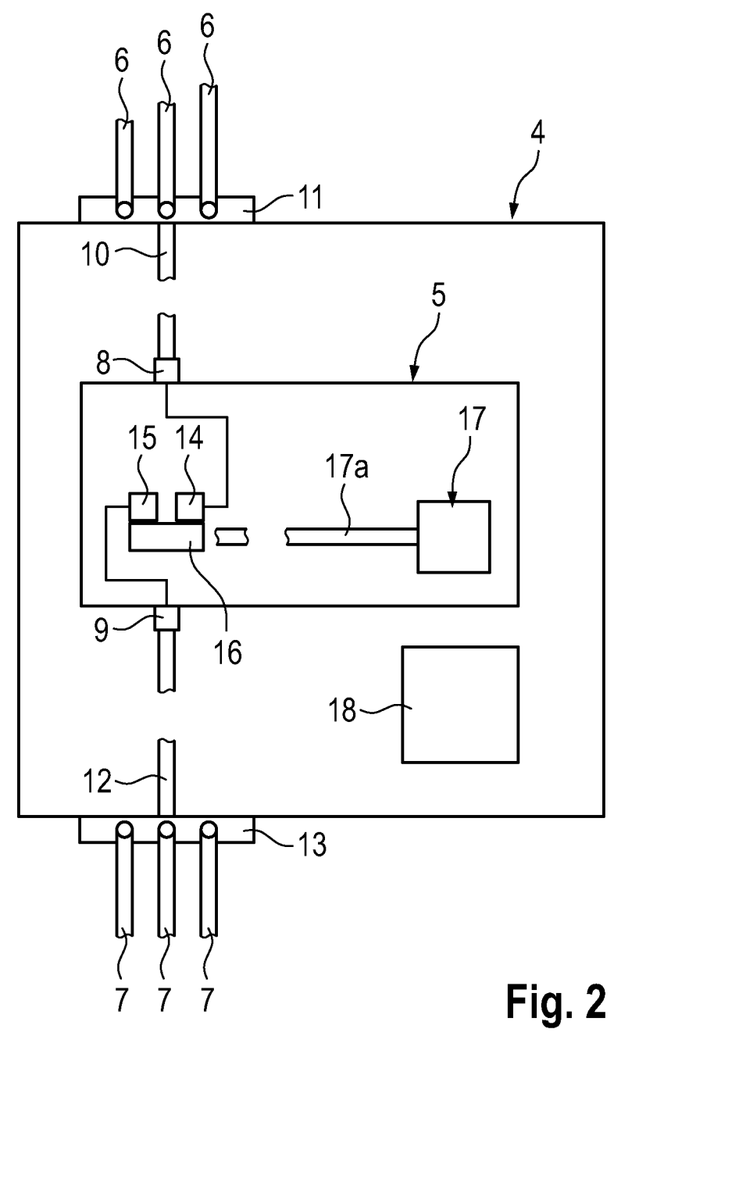
FIG. 2 is a greatly simplified schematic view of the essential components of the voltage limiting device that has the switching device according to the invention.

FIG. 2 shows the components of the voltage limiting device 4 that are essential for the invention in a highly simplified schematic view. The voltage limiting device 4 has the switching device 5 according to the invention in order to establish an electrical connection between one or more cables 6 that lead to a component (not shown) or assembly of the railway power supply system, for example a track, and one or more cables 7 that can be connected to an earthing system (not shown) or to another track. In the present embodiment, the switching device is a DC switching device.

The switching device 5 according to the invention has a first device terminal 8 and a second device terminal 9. The first device terminal 8 is electrically connected to a first cable terminal 11 by a first electrical conductor 10 and the second device terminal 9 is electrically connected to a second cable terminal 13 by a second electrical conductor 12. One or more cables 6, which for example lead to a track, can be connected to the first cable terminal 11, and one or more cables 7 which are connected to an earthing system, for example, can be connected to the second cable terminal 13.

The switching device 5 can be constructed as a conventional contactor which is suitable for switching high direct currents. However, the switching device according to the invention differs from a conventional contactor by virtue of the special arrangement and design of the switching contacts. The switching device 5 has two fixed switching contacts 14, 15 and a movable switching contact 16, the special arrangement of which will be described in detail below.

The switching device 5 has an electromagnetic actuation unit 17, which may comprise a coil and a magnet armature, in order to actuate a shaft 17A with which the movable switching contact 16 is opened or closed. The switching device may also have other components, for example a so-called arc blowout chimney, which belong to the prior art. The actuation unit 17 may also be referred to as an actuator 17.

In addition, the voltage limiting device 4 has an operating and control unit 18. The components of the voltage limiting device are located in a control cabinet.

Figure 3:
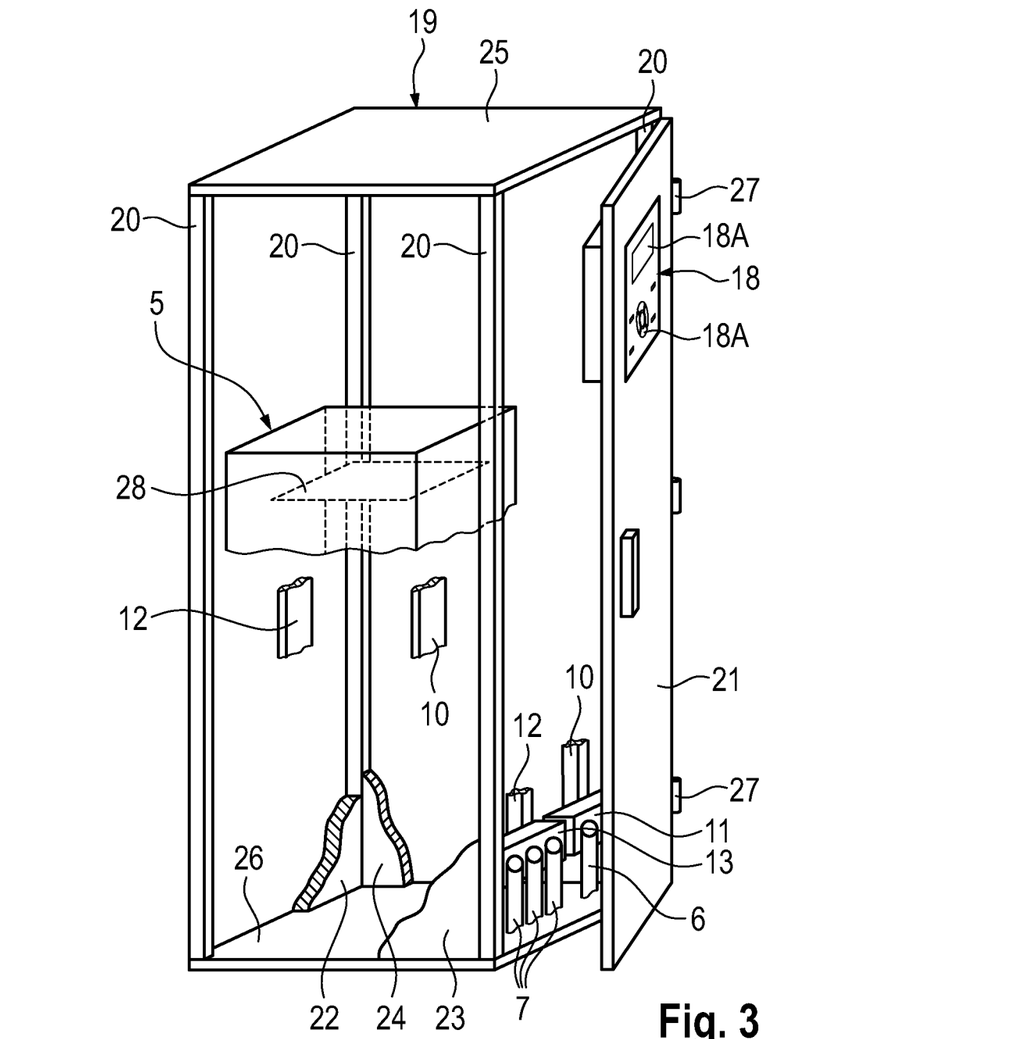
FIG. 3 shows a control cabinet with the voltage limiting device.

FIG. 3 shows a simplified perspective view of the control cabinet 19. In the position shown in FIG. 3, the control cabinet 19 has four vertical profile bars 20 to which a front part 21, a rear part 22, a left-hand side part 23, a right-hand side part 24, a top part 25 and a bottom part 26 are attached. The front part 21 is a pivotable door which is fixed to side hinges 27 on the right-hand side of the control cabinet 19.

The operating and control unit 18 is located in the upper half of the door of the control cabinet 19, so that the operating elements 18A are accessible from the outside. The switching device 5 is located inside the control cabinet 19. In FIG. 3, the switching device 5 is shown only schematically. The first and second cable terminals 11 and 13 are located in the lower half of the control cabinet 19. The conductors 10, 12 leading to the switching device 5 are only indicated in outlines.

The particular arrangement and design of the switching contacts and the conductors leading to the device terminals of the switching device are described below with reference to FIGS. 4 to 8.

Figure 4:
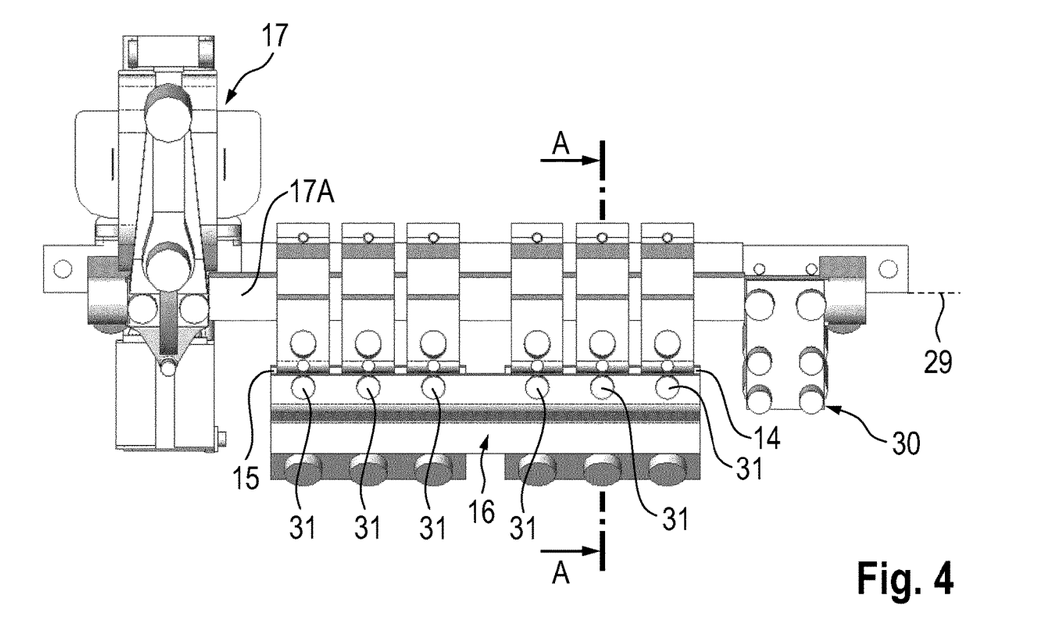
FIG. 4 is a plan view of an embodiment of the switching device with the fixed switching contacts and the movable switching contact as well as the actuation unit.
Figure 5:
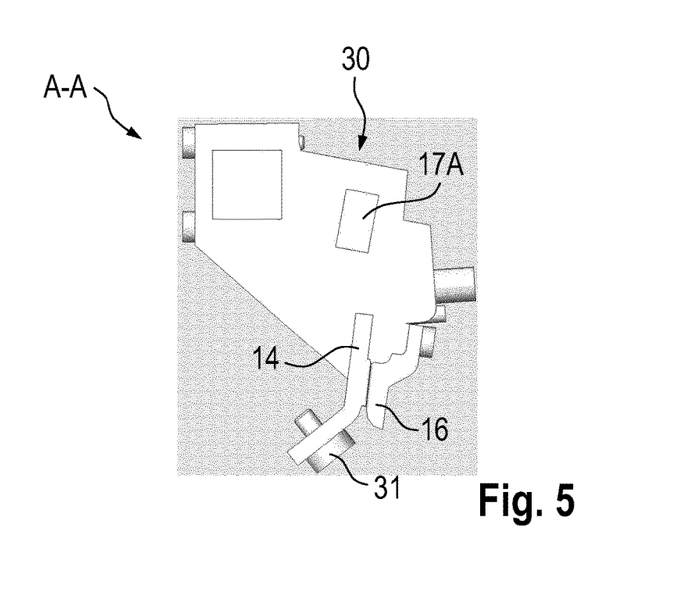
FIG. 5 is a sectional view along the line A-A of FIG. 4.
Figure 6:
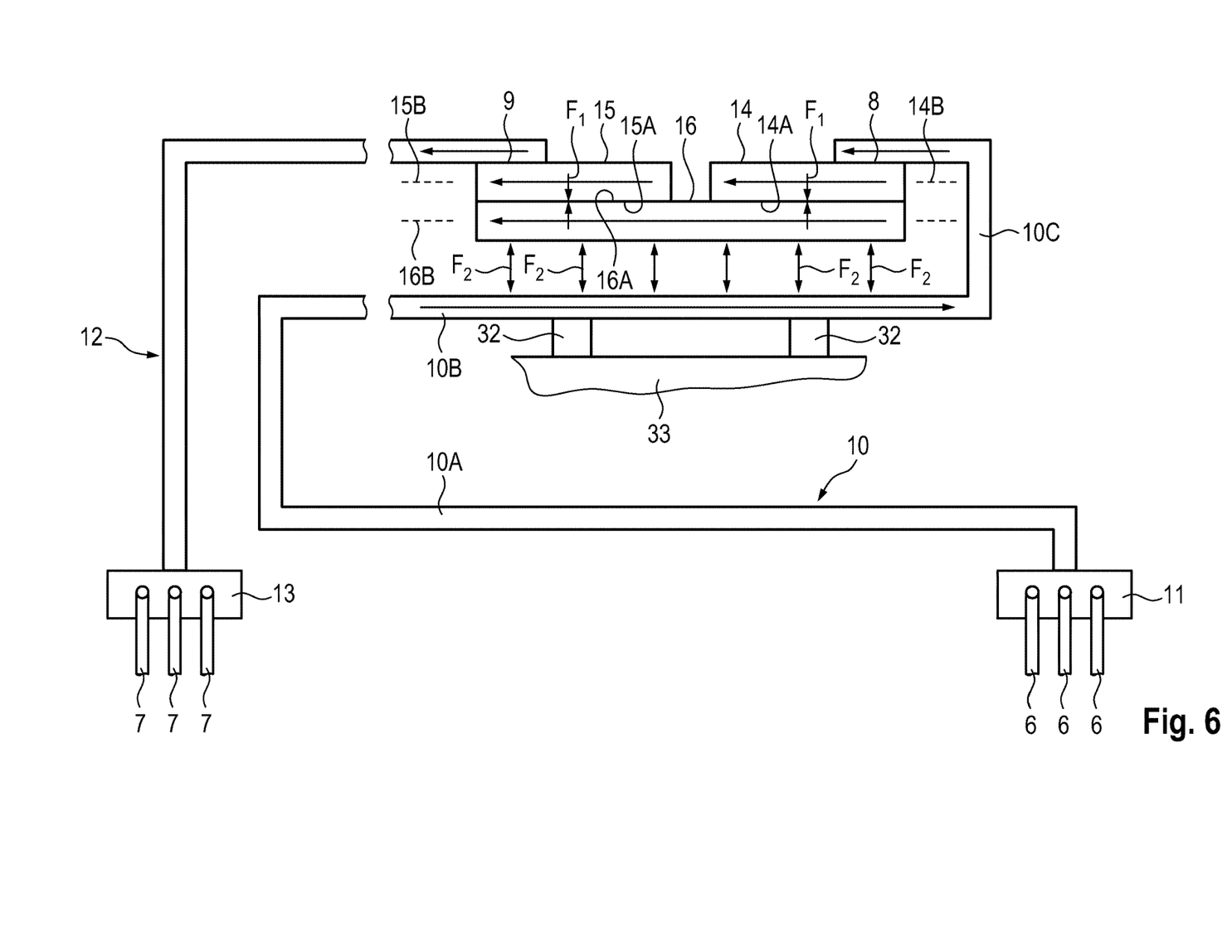
FIG. 6 is a schematic view of the arrangement of the fixed switching contacts and the movable switching contact of the switching device, as well as the conductors leading to the device terminals of the switching device.
Figure 7:
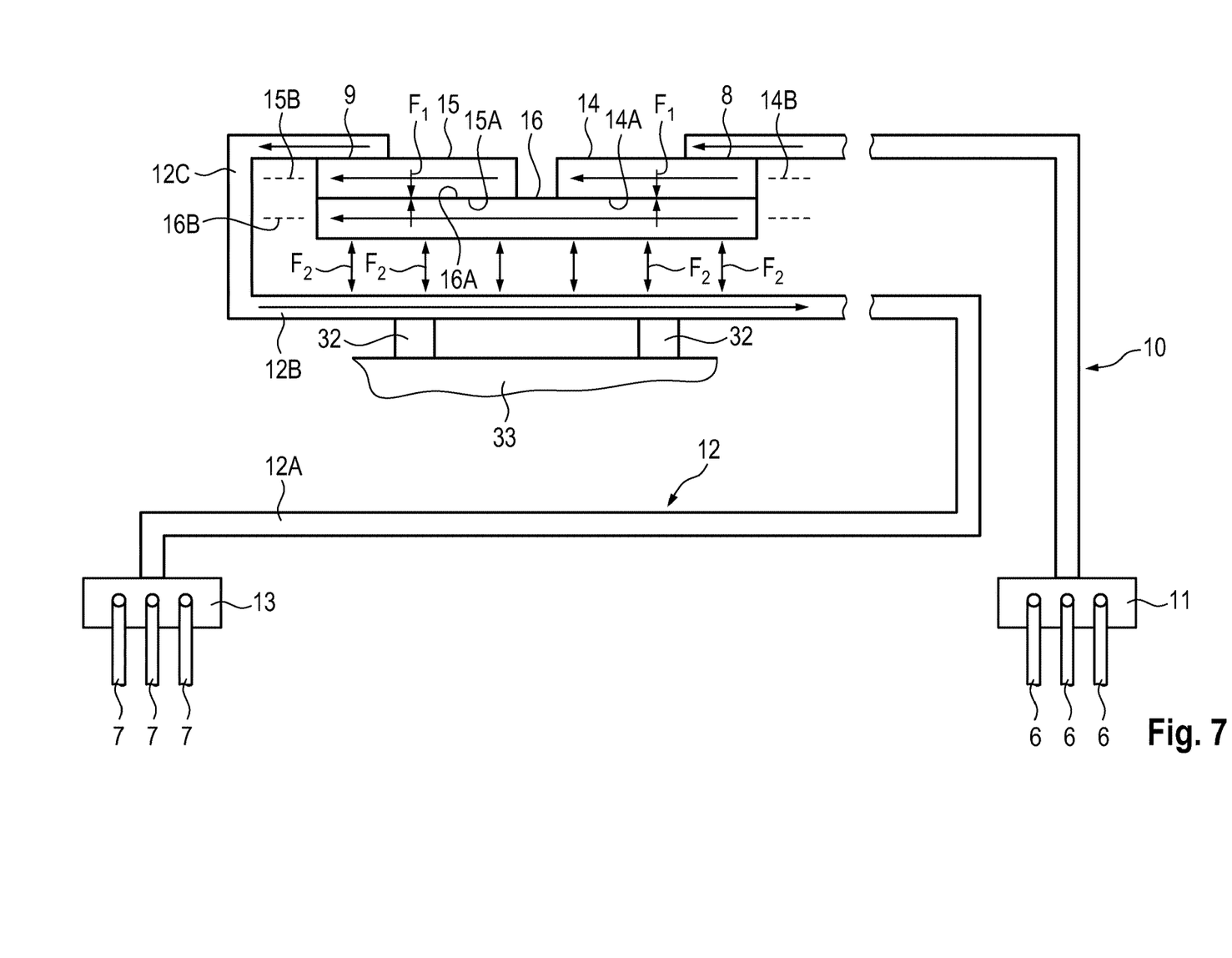
FIG. 7 is a schematic view of an alternative embodiment of the arrangement of the fixed switching contacts and the movable switching contact of the switching device, as well as the conductors leading to the device terminals of the switching device.
Figure 8:
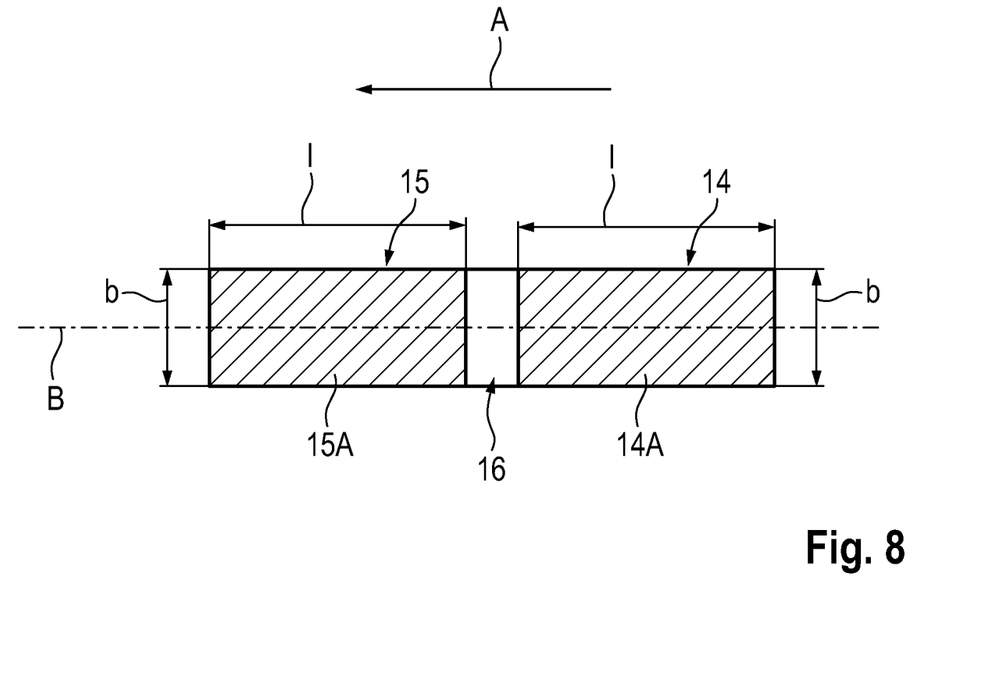
FIG. 8 is a greatly simplified schematic view of the switching contacts.

FIGS. 4 and 5 show the components of the switching device that are essential for the invention in detail, with FIG. 5 being a sectional view along the line A-A. FIGS. 6 and 7 are simplified schematic views and FIG. 8 is a schematic diagram. In FIGS. 4 to 8, the parts corresponding to one another are provided with the same reference signs as in FIG. 2.

In the present embodiment, the switching device 5 has two fixed switching contacts 14, 15 and one movable switching contact 16. In the present embodiment, the switching contacts 14 to 16 have a substantially rectangular cross-section. A rectangular cross section may be described as including two narrow sides and two broad or wide sides. The fixed switching contacts 14, 15 are flat rails made of a conductive material, for example copper, which are arranged at a distance from one another. The contact surfaces 14A, 15A, which are located on the wide sides of the fixed switching contacts, point in one direction. The movable switching contact 16 is also a flat rail made of a conductive material, for example copper, which has a substantially rectangular cross-section. The contact surface 16A of the movable switching contact 16 is located on its wide side. The movable switching contact 16 is arranged in relation to the first and second fixed switching contacts 14, 15 in such a way that its contact surface 16A faces the contact surfaces 14A, 15A of the first and second fixed switching contacts 14, 15. The movable switching contact 16 has the same length as the sum of the lengths of the fixed switching contacts 14, 15 and the distance between the fixed switching contacts. The longitudinal axes 14B, 15B of the fixed switching contacts 14, 15 and the longitudinal axis 16B of the movable switching contact 16 are parallel. The switching contacts 14 to 16 are in the same plane or at the same height.

In the present embodiment, the switching device 5 is arranged in the control cabinet 19 such that the switching contacts 14 to 16 lie in a substantially horizontal plane 28 with respect to the control cabinet, i.e. are substantially at the same height in the control cabinet, with the fixed switching contacts 14, 15 facing the rear part 22 of the control cabinet and the movable switching contact 16 facing the front part 21 of the control cabinet (FIG. 3). The switching contacts can also be arranged in a vertical plane.

FIGS. 4 and 5 show the fixed switching contacts 14, 15 lying next to one another and the movable switching contact 16 arranged in front of the fixed switching contacts in the present view in detail. The movable switching contact 16 is pivotable about a horizontal axis 29, so that the movable switching contact can be moved between a closed position, in which the first and second fixed switching contacts 14, 15 are electrically connected to one another, and an open position, in which the first and second fixed switching contact are disconnected from one another.

The movable switching contact 16 is actuated by the actuation unit 17, which is arranged next to the switching contacts 14 to 16, for example on the left-hand side. On the other side of the switching contacts, there is a mechanism 30 in order to resiliently pretension the movable switching contact 16 onto the fixed switching contacts 14, 15. For the sake of clarity, the electrical connections to the device terminals 8, 9 and parts of the mechanics are not shown. On the switching contacts 14 to 16, parts for fastening the contacts can also be provided that can be an integral part of the contacts. The movable switching contact 16 is screwed, for example by means of screws 31, to fastening elements, not shown in detail, which in turn are connected to the shaft 17A of the actuation unit 17.

The first fixed switching contact 14 is connected to the first conductor 10 and the second fixed switching contact 15 is connected to the second conductor 12 (FIGS. 2 and 6). In the present embodiment, the first and second conductors 10, 12 are flat rails made of a conductive material such as copper. The conductors 10, 12 are connected to connection surfaces 8, 9, which can be provided on the side of the fixed switching contacts 14, 15 opposite the contact surfaces 14A, 15A. This region represents the device terminal 8, 9 of the switching device 5.

It is assumed below that a current flows from the first cable terminal 11 to the second cable terminal 13 during the operation of the switching device 5. The longitudinal axes 14B, 15B of the fixed switching contacts 14, 15 and the longitudinal axis 16B of the movable switching contact 16 are parallel. Due to the current flow, which is indicated by arrows, electrodynamic forces act on the switching contacts 14 to 16. Because currents flow through the fixed switching contacts 14, 15 and the movable switching contact 16 in the same direction, forces $F_1$ act on the switching contacts and are directed in such a way that the switching contacts attract one another. The forces $F_1$ are indicated by arrows in FIG. 6. As a result of the current flow, larger forces $F_1$ act on the switching contacts and lead to the contact force becoming greater or to the forces required to close the switch becoming smaller. This relieves the load on the electrically conductive components. As a result, the switching device can switch and conduct higher currents with the same dimensions as a conventional switching device.

FIG. 8 shows a greatly simplified schematic view of the switching contacts 14, 15, 16 in plan view. In the present illustration, the first and second fixed switching contacts 14, 15 are arranged above the movable switching contact 16. The current flows from the first fixed switching contact 14 via the movable switching contact 16 to the second fixed switching contact 15. The direction of current flow is denoted by A. The longitudinal axes of the switching contacts 14, 15, 16 are denoted by B. The region in which the contact surface 14A or 15B of the relevant fixed switching contact 14, 15 touches the contact surface 16A of the movable switching contact 16, i.e. the effective contact region, is marked with hatching. It can be seen that the contact surfaces or the effective contact regions extend in the direction of current flow A, i.e. have a length 1 which is greater than the width b. The contact surfaces are longer, preferably much longer, than they are wide.

The supporting effect of a higher contact pressure on the switching contact is achieved by the special arrangement and design of the conductors 10 (FIG. 6) or 12 (FIG. 7). FIG. 6 shows an embodiment in which a conductor portion 10B of the first conductor 10 is arranged in a parallel orientation to the movable switching contact 16 in a region in front of the movable switching contact 16 such that the movable switching contact moves away from the parallel conductor portion 10B of the first conductor 10 when there is movement from the open position into the closed position shown in FIG. 6.

In the present embodiment, the parallel conductor portion 10B of the first conductor 10 is arranged in the same horizontal plane 28 as the switching contacts 14 to 16 of the switching device. The parallel conductor portion 10B, which preferably has a rectangular cross-section, can be a flat rail made of a conductive material, for example copper. The wide sides of the conductor portion 10B and the movable switching contact 16 are opposite one another. An exact parallel orientation of the wide sides (surfaces) is advantageous but not necessary. The flat conductors can also be slightly tilted towards one another. The conductor portion 10B should have a length which is at least as long as the length of the movable switching contact 16. The conductor portion 10B is firmly connected by means of insulators 32 to supports 33, which can be fastened to the posts 20 or other parts of the control cabinet 19. The fastening of the remaining conductor portions of the first conductor 10 and the fastening of the second conductor 12 are not shown.

The first conductor 10 has a conductor portion 10A which electrically connects the first cable terminal 11 to the end portion of the parallel conductor portion 10B of the first conductor that is on the side of the second fixed switching contact 15, and the first conductor 10 has a conductor portion 10C which electrically connects the end portion of the parallel conductor portion 10B of the first conductor 10 that is on the side of the first fixed switching contact 14 to the first device terminal or the first switching contact 14. The second conductor 12 connects the second switching contact 15 to the second cable terminal 13. The currents in the parallel conductor portion 10B of the first conductor 10 and in the movable switching contact 16 thus flow in an opposite direction. When there is a current flow, the parallel fixed conductor portion 10B and the movable switching contact 16 consequently repel one another. As a result, a pressing force is exerted on the movable switching contact 16, so that the contact force is increased and the lifting of the contacts during switching is minimised. In this embodiment the parallel conductor portion 10B may be referred to as an intermediate portion 10B of the first conductor 10. The conductor portion 10A may be referred to as an upstream portion 10A of the first conductor 10. The conductor portion 10C may be referred to as a downstream portion 10C of the first conductor 10.

FIG. 7 shows an alternative embodiment which differs from the embodiment of FIG. 6 only on account of the connection of the first and second conductors 10, 12 to the cable terminals 11, 13. Like parts are identified by the same reference signs. In the alternative embodiment, it is not the first conductor 10, but rather the second conductor 12, which has a conductor portion 12B which is guided parallel to the movable switching contact 16. The second conductor 12 has a conductor portion 12A, which electrically connects the second cable terminal 13 to the end portion of the parallel conductor portion 12B of the second conductor 12 that is on the side of the first fixed switching contact 14, and the second conductor 12 has a conductor portion 12C which electrically connects the end portion of the parallel conductor portion 12B that is on the side of the second fixed switching contact 15 to the second device terminal 9 or the second switching contact 15. The currents in the parallel conductor portion 12B and in the movable switching contact 16 also flow in the opposite direction in this arrangement. As a result, the parallel conductor portion 12B and the movable switching contact 16 repel one another, whereby an additional pressing force is exerted on the movable switching contact 16. In this embodiment the parallel conductor portion 12B may be referred to as an intermediate portion 12B of the second conductor 12. The conductor portion 12C may be referred to as an upstream portion 12C of the second conductor 12. The conductor portion 12A may be referred to as a downstream portion 12A of the second conductor 12.

In addition to the above embodiments, other embodiments are also possible in which the first and second conductors 10, 12 are connected in such a way that the direction of current flow is reversed, i.e. the current flows from the second fixed switching contact 15 via the movable switching contact 16 to the first fixed switching contact 14.

The first conductor may have a conductor portion that electrically connects the first cable terminal to the end portion of the parallel conductor portion of the first conductor that is on the side of the first fixed switching contact, and the first conductor may have a conductor portion that electrically connects the end portion of the parallel conductor portion of the first conductor that is on the side of the second fixed switching contact to the second device terminal or the second switching contact. The second conductor can connect the first fixed switching contact to the second cable terminal. The currents in the parallel conductor portion of the first conductor and in the movable switching contact thus flow in an opposite direction. As a result, the parallel conductor portion and the movable switching contact repel one another when a current flows.

The first conductor may also connect the first cable terminal to the second fixed switching contact, the second conductor having a conductor portion which electrically connects the second cable terminal to the end portion of the parallel conductor portion of the second conductor that is on the side of the second fixed switching contact, and the second conductor may have a conductor portion which connects the end portion of the parallel conductor portion of the second conductor that is on the side of the first fixed switching contact to the first fixed switching contact.

The invention claimed is:

1. A voltage limiting device, comprising:
  a switching device including a movable switching contact movable between a closed position and an open position;
  a first cable terminal;
  a second cable terminal;
  a first electrical conductor electrically connecting the first cable terminal to the switching device;
  a second electrical conductor electrically connecting the second cable terminal to the switching device;
  wherein a conductor portion of the first or second electrical conductor is arranged in a substantially parallel orientation to the movable switching contact in a region such that the movable switching contact moves away from the conductor portion when the movable switching contact moves from the open position into the closed position, so that during operation of the switching device current flows through the conductor portion in a direction opposite from which current flows through the movable switching contact;
  wherein the switching device includes a first fixed switching contact including a first fixed switching contact surface and a second fixed switching contact including a second fixed switching contact surface, the first and second fixed switching contacts being arranged next to one another such that the first and second fixed switching contact surfaces face in the same direction;

wherein the first and second fixed switching contacts are elongated along first and second longitudinal axes, respectively; and wherein the movable switching contact is pivotable between the closed position and the open position about an axis parallel to the longitudinal axes of the first and second fixed switching contacts.

2. The voltage limiting device of claim 1, wherein:

the first and second fixed switching contacts are arranged next to one another such that the first and second fixed switching contact surfaces face in the same direction;

the movable switching contact includes a movable switching contact surface and the movable switching contact is arranged relative to the first and second fixed switching contacts such that the movable switching contact surface faces the first and second fixed switching contact surfaces; and wherein the first and second fixed switching contacts are electrically connected to one another in the closed position of the movable switching contact and the first and second fixed switching contacts are electrically disconnected from one another in the open position of the movable switching contact.

3. The voltage limiting device of claim 2, wherein:

at least one of the first and second fixed switching contact surfaces is an elongated contact surface extending parallel to a direction of current flow.

4. The voltage limiting device of claim 1, wherein:

in the closed position of the movable switching contact the conductor portion and the movable switching contact lie in one plane.

5. The voltage limiting device of claim 1, wherein:

the conductor portion is a straight conductor portion having a rectangular cross-section including two narrow sides and two broad sides.

6. The voltage limiting device of claim 5, wherein:

the conductor portion is arranged such that one of the broad sides faces the movable switching element.

7. The voltage limiting device of claim 1, wherein:

the first and second fixed switching contacts are arranged next to one another such that the first and second fixed switching contact surfaces face in the same direction;

the conductor portion is an intermediate portion of the first electrical conductor and includes a first end portion facing the first fixed switching contact and a second end portion facing the second fixed switching contact;

the first electrical conductor further includes an upstream conductor portion extending from the first cable terminal to the second end portion of the intermediate conductor portion;

the first electrical conductor further includes a downstream conductor portion extending from the first end portion of the intermediate conductor portion to the switching device; and the second electrical conductor extends from the switching device to the second cable terminal.

8. The voltage limiting device of claim 1, wherein:

the first and second fixed switching contacts are arranged next to one another such that the first and second fixed switching contact surfaces face in the same direction;

the first electrical conductor extends from the first cable terminal to the switching device;

the conductor portion is an intermediate portion of the second electrical conductor and includes a first end portion facing the first fixed switching contact and a second end portion facing the second fixed switching contact;

the second electrical conductor further includes an upstream conductor portion extending from the switching device to the second end portion of the intermediate conductor portion; and the second electrical conductor further includes a downstream conductor portion extending from the first end portion of the intermediate conductor portion to the second cable terminal.

9. The voltage limiting device of claim 1, wherein:

the first and second fixed switching contacts being are arranged next to one another such that the first and second fixed switching contact surfaces face in the same direction; and the first and second fixed switching contacts are straight electrical conductors each having a rectangular cross-section having two narrow sides and two broad sides.

10. The voltage limiting device of claim 9, wherein:

the first and second fixed switching contacts are arranged such that one of their broad sides form the first and second fixed switching contact surfaces, respectively.

11. The voltage limiting device of claim 1, wherein:

the movable switching contact is a straight electrical conductor having a rectangular cross-section having two narrow sides and two broad sides.

12. The voltage limiting device of claim 11 wherein:

the movable switching contact is arranged such that one of the broad sides forms a movable switching contact surface.

13. The voltage limiting device of claim 1, wherein:

the first and second fixed switching contacts are arranged next to one another such that the first and second fixed switching contact surfaces face in the same direction; and the movable switching contact has a length in the direction of current flow greater than or equal to a sum of a length of the first fixed switching contact in the direction of current flow plus a length of the second fixed switching contact in the direction of current flow plus a distance between the first and second fixed switching contacts.

14. The voltage limiting device of claim 1, further comprising:

an actuator configured to move the movable switching contact between the closed position and the open position.

15. The voltage limiting device of claim 1, wherein:

the voltage limiting device is arranged in a control cabinet.

* * * * *

UNITED STATES PATENT AND TRADEMARK OFFICE
CERTIFICATE OF CORRECTION

| | | |
|---|---|---|
| PATENT NO. | : 12,125,654 B2 | Page 1 of 1 |
| APPLICATION NO. | : 17/625303 | |
| DATED | : October 22, 2024 | |
| INVENTOR(S) | : Julian Beuchelt | |

It is certified that error appears in the above-identified patent and that said Letters Patent is hereby corrected as shown below:

In the Specification

Column 8, Line 60 - replace the number "1" with the letter -- l --

In the Claims

Column 12, Line 20 - delete the word "being"

Signed and Sealed this
Twenty-fourth Day of December, 2024

Derrick Brent
*Acting Director of the United States Patent and Trademark Office*